United States Patent
Nagashima

(10) Patent No.: US 7,158,250 B2
(45) Date of Patent: Jan. 2, 2007

(54) INFORMATION PROCESSING APPARATUS, INFORMATION PROCESSING SYSTEM, INFORMATION PROCESSING METHOD, COVERSHEET GENERATING METHOD, PROGRAM, AND STORAGE MEDIUM

(75) Inventor: Takeyuki Nagashima, Tokyo (JP)

(73) Assignee: Canon Kabushiki Kaisha (JP)

( * ) Notice: Subject to any disclaimer, the term of this patent is extended or adjusted under 35 U.S.C. 154(b) by 915 days.

(21) Appl. No.: 10/076,877

(22) Filed: Feb. 15, 2002

(65) Prior Publication Data

US 2002/0122202 A1    Sep. 5, 2002

(30) Foreign Application Priority Data

Feb. 16, 2001 (JP) ............................. 2001-040402
Aug. 9, 2001 (JP) ............................. 2001-242046

(51) Int. Cl.
G06F 3/12 (2006.01)
(52) U.S. Cl. .................. 358/1.15; 358/1.15; 358/403; 358/468; 709/219
(58) Field of Classification Search ............... 358/1.15, 358/403, 468; 709/219
See application file for complete search history.

(56) References Cited

U.S. PATENT DOCUMENTS 5,438,433 A * 8/1995 Reifman et al. ............ 358/468
5,444,841 A * 8/1995 Glaser et al. ............... 715/506

* cited by examiner

Primary Examiner—Kimberly Williams
Assistant Examiner—Andrew Lam
(74) Attorney, Agent, or Firm—Rossi, Kimms & McDowell, LLP

(57) ABSTRACT

There is provided an information processing apparatus capable of improving the operability in producing a coversheet in which plural information is written, and preventing generation of a coversheet having an improper layout resulting from the inconsistency in number between the information and fixed character strings. A plural information field is defined in a text field provided on a coversheet template and in which information is to be written, the plural information field being for setting therein attributes specifying the information to be written in the text field, and a number of the information to be written. Fixed character strings to be written in the text field of the coversheet template are set in the coversheet template in association with the information specified by the attributes set in the plural information field. The fixed character strings are repeatedly expanded on the text field of the coversheet template a number of times corresponding to the set number of the information. The information specified by the attributes set in the plural information field is repeatedly expanded a number of times corresponding to the set number of the information. The coversheet template having the fixed character strings and the information expanded on the text field is added as a coversheet to data.

23 Claims, 17 Drawing Sheets

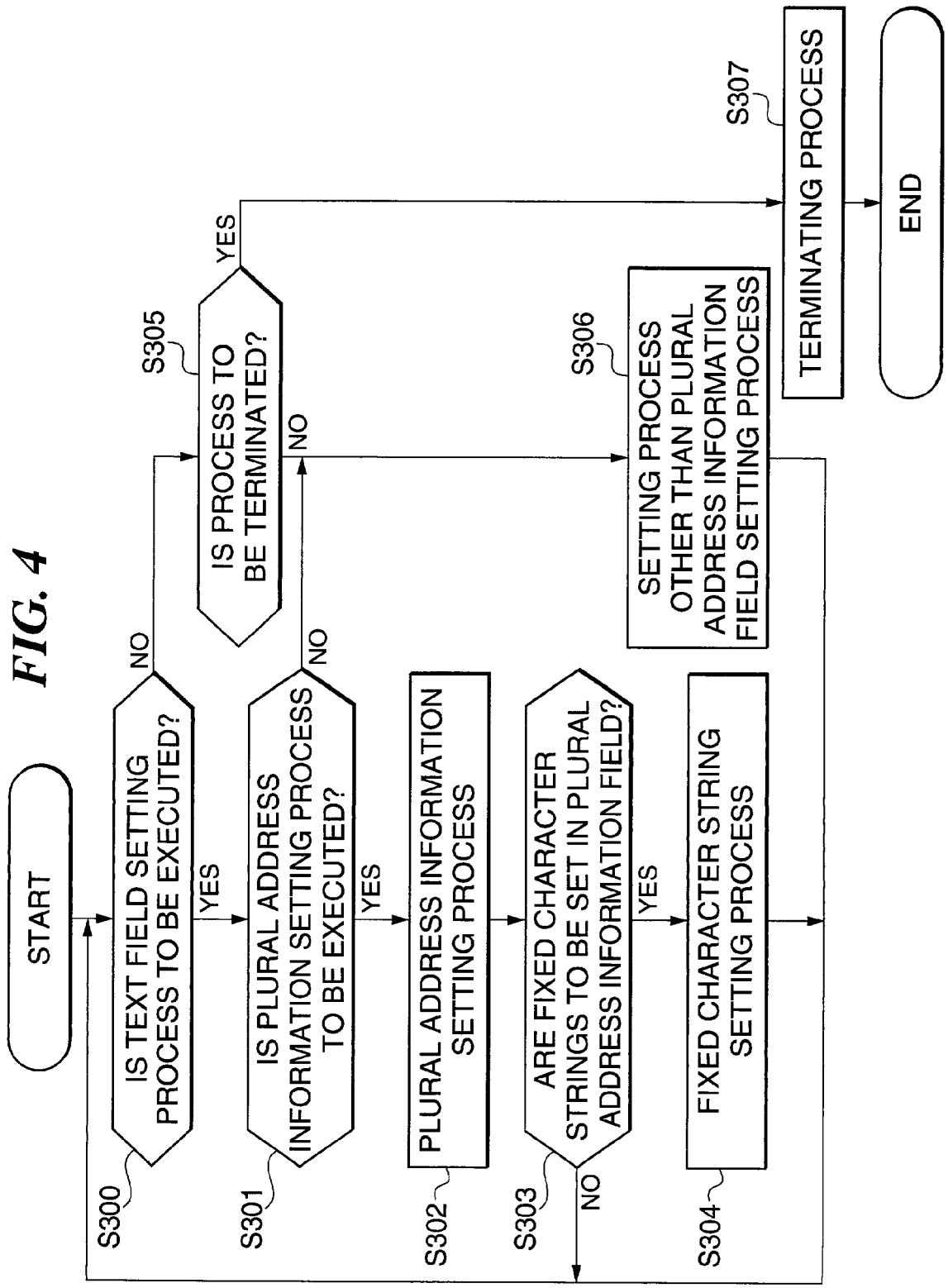

FIG. 6

| PRODUCED FILE ID | FILE NAME | LOCATION OF PRODUCED FILE |
|---|---|---|
| 1 | TempA | ¥¥temp¥cs¥temp01.cst |
| 2 | TempB | ¥¥temp¥cs¥temp02.cst |
| 3 | TempC | ¥¥temp¥cs¥temp03.cst |
| ⋮ | ⋮ | ⋮ |
| m-1 | Temp m-1 | ¥¥temp¥cs¥temp_m-1.cst |
| m | Temp m | ¥¥temp¥cs¥temp_m.cst |

FIG. 7

| REGISTERED FILE ID | REGISTERED FILE NAME | LOCATION OF REGISTERED FILE |
|---|---|---|
| 1 | TMPa | ¥¥tmp¥cs¥tmp03.cst |
| 2 | TMPb | ¥¥tmp¥cs¥tmp01.cst |
| 3 | TMPc | ¥¥tmp¥cs¥tmp02.cst |
| ⋮ | ⋮ | ⋮ |
| x-1 | TMP y-1 | ¥¥tmp¥cs¥tmp_m-1.cst |
| x | TMP y | ¥¥tmp¥cs¥tmp_m.cst |

FIG. 10

| | |
|---|---|
| NAME | AAA |
| ADDRESS | aaaaaaaaaaa |
| TELEPHONE | 1111111111 |
| NAME | BBB |
| ADDRESS | bbbbbbbbbbb |
| TELEPHONE | 2222222222 |
| NAME | CCC |
| ADDRESS | ccccccccccc |
| TELEPHONE | 3333333333 |

FIG. 16

ADDRESS INFORMATION A-d

Mr. DDD
jklmnopqrstu
000111222
Mr. EEE
mnopqrstuvwx
1234567890
Mr. FFF
abcdefghijk
111222333
Mr. GGG
defghijklmn
444555666
Mr. HHH
ghijklmnopq
777888999

FIG. 18

ADDRESS INFORMATION A-b

Mr. FFF
abcdefghijk
111222333
Mr. GGG
defghijklmn
444555666
Mr. HHH
ghijklmnopq
777888999

INFORMATION PROCESSING APPARATUS, INFORMATION PROCESSING SYSTEM, INFORMATION PROCESSING METHOD, COVERSHEET GENERATING METHOD, PROGRAM, AND STORAGE MEDIUM

BACKGROUND OF THE INVENTION

1. Field of the Invention

The present invention relates to an information processing apparatus having a function of adding a coversheet to data, an information processing method, a program for implementing the method, and a storage medium storing the program.

Further, the present invention relates to an information processing apparatus having a function of transferring transmission data having attached thereto a coversheet on which address information is expanded (drawn), to a data communication apparatus, an information processing system, a coversheet generating method, and a storage medium storing a program for implementing the method.

2. Description of the Related Art

Conventionally, some facsimile drivers and printer drivers with a facsimile function, which are installed in computers, have a function of adding a coversheet to a top page of transmission data when transmitting data produced by a computer. The coversheet may be generated using a coversheet template. A text field is provided in the coversheet template, and address information and fixed character strings representing the address information are written into the text field. When producing the coversheet template, a plural address information field in which plural address information is written must be defined in the text field, and fixed character strings representing the respective address information must be set by means of text data.

For example, to produce a coversheet in which is written a plurality of address information (information including the names, addresses, and telephone numbers of recipients), a plural address information field where a plurality of address information is written must be defined in the text field on the coversheet template for the coversheet, and characters such as "Name", "Address", and "Telephone Number" must be defined in advance as a fixed character string corresponding to each of the address information written in the plural address information field.

When producing a coversheet in the above-mentioned manner, however, it is necessary to set fixed character strings corresponding in number to the number of address information, and hence the favorable operability cannot be achieved. Moreover, if the number of address information does not coincide with the number of fixed character strings due to erroneous input, a coversheet with an improper layout may be generated.

SUMMARY OF THE INVENTION

It is a first object of the present invention to provide an information processing apparatus and an information processing method, which are capable of improving the operability in producing a coversheet in which is written a plurality of information and preventing generation of a coversheet with an improper layout resulting from the inconsistency in number between the information and fixed character strings, as well as a program for implementing the method, and a storage medium storing the program.

It is a second object of the present invention to provide an information processing apparatus, an information processing system, and a coversheet generating method, which are capable of realizing the excellent operability and flexibility in generating a coversheet that is to be attached to transmission data, as well as a storage medium storing a program for implementing the method.

To attain the first object, a first aspect of the present invention provides an information processing apparatus having a function of adding a coversheet to data, comprising defining means for defining a plural information field in a text field provided on a coversheet template and in which information is to be written, the plural information field being for setting therein attributes specifying the information to be written in the text field, and a number of the information to be written, fixed character string setting means for setting at least one fixed character string to be written in the text field of the coversheet template, in the coversheet template in association with the information specified by the attributes set in the plural information field, fixed character string expanding means for repeatedly expanding the at least one fixed character string on the text field of the coversheet template a number of times corresponding to the set number of the information, information expanding means for repeatedly expanding the information specified by the attributes set in the plural information field a number of times corresponding to the set number of the information, and adding means for adding the coversheet template having the at least one fixed character string and the information expanded on the text field, as a coversheet to data.

With the above arrangement, it is possible to improve the operability in producing a coversheet in which is written a plurality of information and prevent generation of a coversheet with an improper layout resulting from the inconsistency in number between the information and fixed character strings.

Preferably, the information processing apparatus according to the first aspect of the present invention comprises storage means for storing the information in association with the attributes, and the information expanding means reads out the information corresponding to the attributes set in the plural information field from the storage means and expands the read out information.

In a typical preferred embodiment, the information to be written in the text field of the coversheet template comprises address information, and the at least one fixed character string comprises at least one character string indicating that the information comprises address information.

Preferably, the information processing apparatus according to the first aspect of the present invention comprises registration means for registering at least one coversheet template in which the plural information field is defined in the text field thereof and the at least one character string is set, and selecting means for selecting a desired coversheet template from the registered at least one coversheet template.

More preferably, the fixed character string expanding means is responsive to selection of the desired coversheet template by the selecting means, for expanding the at least one fixed character string set in the selected coversheet template, and the information expanding means is responsive to the selection, for expanding the information specified by the attributes set in the plural information field defined in the selected coversheet template.

Preferably, the information processing apparatus according to the first aspect of the present invention comprises registration means for registering at least one coversheet template in which the plural information field is defined, and selecting means for selecting a desired coversheet template from the at least one registered coversheet template.

More preferably, the information processing apparatus according to the first aspect of the present invention comprises determination means responsive to selection of the desired coversheet template by the selecting means, for determining whether or not the at least one character string is set in the selected coversheet template, and wherein if no fixed character string is set in the selected coversheet template, the information expanding means expands only the information specified by the attributes set in the plural information field defined in the selected coversheet template.

To attain the first object, a second aspect of the present invention provides an information processing method for adding a coversheet to data, comprising the steps of defining a plural information field in a text field provided on a coversheet template and in which information is to be written, the plural information field being for setting therein attributes specifying the information to be written in the text field, and a number of the information to be written, setting at least one fixed character string to be written in the text field of the coversheet template, in the coversheet template in association with the information specified by the attributes set in the plural information field, repeatedly expanding the at least one fixed character string on the text field of the coversheet template a number of times corresponding to the set number of the information, repeatedly expanding the information specified by the attributes set in the plural information field a number of times corresponding to the set number of the information, and adding the coversheet template having the at least one fixed character string and the information expanded on the text field, as a coversheet to data.

To attain the first object, a third aspect of the present invention provides a program for adding a coversheet to data, comprising a defining module for defining a plural information field in a text field provided on a coversheet template and in which information is to be written, the plural information field being for setting therein attributes specifying the information to be written in the text field, and a number of the information to be written, a setting module for setting at least one fixed character string to be written in the text field of the coversheet template, in the coversheet template in association with the information specified by the attributes set in the plural information field, a fixed character string expanding module for repeatedly expanding the at least one fixed character string on the text field of the coversheet template a number of times corresponding to the set number of the information, an information expanding module for repeatedly expanding the information specified by the attributes set in the plural information field a number of times corresponding to the set number of the information, and an adding module for adding the coversheet template having the at least one fixed character string and the information expanded on the text field, as a coversheet to data.

To attain the first object, a fourth aspect of the present invention provides a computer-readable storage medium storing a program for adding a coversheet to data, the program comprising a defining module for defining a plural information field in a text field provided on a coversheet template and in which information is to be written, the plural information field being for setting therein attributes specifying the information to be written in the text field, and a number of the information to be written, a setting module for setting at least one fixed character string to be written in the text field of the coversheet template, in the coversheet template in association with the information specified by the attributes set in the plural information field, a fixed character string expanding module for repeatedly expanding the at least one fixed character string on the text field of the coversheet template a number of times corresponding to the set number of the information, an information expanding module for repeatedly expanding the information specified by the attributes set in the plural information field a number of times corresponding to the set number of the information, and an adding module for adding the coversheet template having the at least one fixed character string and the information expanded on the text field, as a coversheet to data.

To attain the second object, a fifth aspect of the present invention provides an information processing apparatus having a function of transferring transmission data, to which is added a coversheet where address information is expanded, to a data communication apparatus, comprising producing means for producing coversheet templates having a text field provided thereon and having no address information; registration means for registering the coversheet templates produced by the producing means, selecting means for selecting a desired coversheet template from the coversheet templates registered by the registration means, and generating means operable when the desired coversheet template is used in generating the transmission data, for defining a field for a plurality of address information in the text field on the coversheet template, and for expanding the plurality of address information according to a size of the text field to generate the coversheet.

With the above arrangement, it is possible to realize the excellent operability and flexibility in generating a coversheet that is to be attached to transmission data.

Preferably, the generating means comprises first expanding means for expanding the plurality of address information by an amount corresponding to a size of the text field on the text field, determination means for determining whether or not there is any address information going beyond the size of the text field, and second expanding means for generating at least one required number of coversheet for the address information going beyond the size of the text field and expanding the address information going beyond the size of the text field on the generated at least one coversheet if the determination means determines that there is any address information going beyond the size of the text field.

In a preferred embodiment, the address information comprises information convertible into text data representing names, addresses, telephone numbers, facsimile numbers, electronic mail addresses, and others of senders and recipients.

In another preferred embodiment, the text field comprises text data including a text region, and attribute fields including a plural address information field.

To attain the second object, a sixth aspect of the present invention also provides an information processing system comprising an information processing apparatus having a function of transferring transmission data to which is attached a coversheet where address information is expanded, and a data communication apparatus that transmits the transmission data transferred from the information processing apparatus, in a predetermined format via a communication medium, wherein the information processing apparatus comprises producing means for producing coversheet templates having a text field provided thereon and having no address information, registration means for registering the coversheet templates produced by the producing means, selecting means for selecting a desired coversheet template from the coversheet templates registered by the registration means, and generating means operable when the desired coversheet template is used in generating the transmission data, for defining a field for a plurality of address information in the text field on the coversheet template, and for expanding the plurality of address information according to a size of the text field to generate the coversheet.

To attain the second object, a seventh aspect of the present invention further provides a coversheet generating method executed by An information processing apparatus having a function of transferring transmission data, to which is added a coversheet where address information is expanded, to a data communication apparatus, comprising the steps of producing coversheet templates having a text field provided thereon and having no address information, registering the coversheet templates produced in the producing step, selecting a desired coversheet template from the coversheet templates registered in the registration step, and generating the coversheet when the desired coversheet template is used in generating the transmission data, by defining a field for a plurality of address information in the text field on the coversheet template, and expanding the plurality of address information according to a size of the text field.

To attain the second object, an eighth aspect of the present invention further provides a computer-readable storage medium storing a program for generating a coversheet where address information is expanded, the program comprising a producing module for producing coversheet templates having a text field provided thereon and having no address information, a registration module for registering the coversheet templates produced by the producing module, a selecting module for selecting a desired coversheet template from the coversheet templates registered by the registration module, and a generating module operable when the desired coversheet template is used in generating the transmission data, for defining a field for a plurality of address information in the text field on the coversheet template, and for expanding the plurality of address information according to a size of the text field to generate the coversheet.

The above and other objects, features and advantages of the invention will become more apparent from the following detailed description taken in conjunction with the accompanying drawings.

BRIEF DESCRIPTION OF THE DRAWINGS

FIG. 4 is a flow chart showing the details of a step S2 (coversheet template producing process) in FIG. 3;

FIG. 6 is a diagram showing the structure of data stored in a registration file A in FIG. 2;

FIG. 7 is a diagram showing the structure of data stored in a registration file B in FIG. 2;

FIG. 10 is a diagram showing a coversheet produced based on the coversheet template in FIG. 8;

FIG. 16 is a diagram showing a second page of the coversheet in FIG. 15;

FIG. 18 is a diagram showing a second page of the coversheet in FIG. 17.

DETAILED DESCRIPTION OF THE PREFERRED EMBODIMENTS

The present invention will now be described in detail with reference to the drawings showing embodiments thereof.

(First Embodiment)

Figure 1:
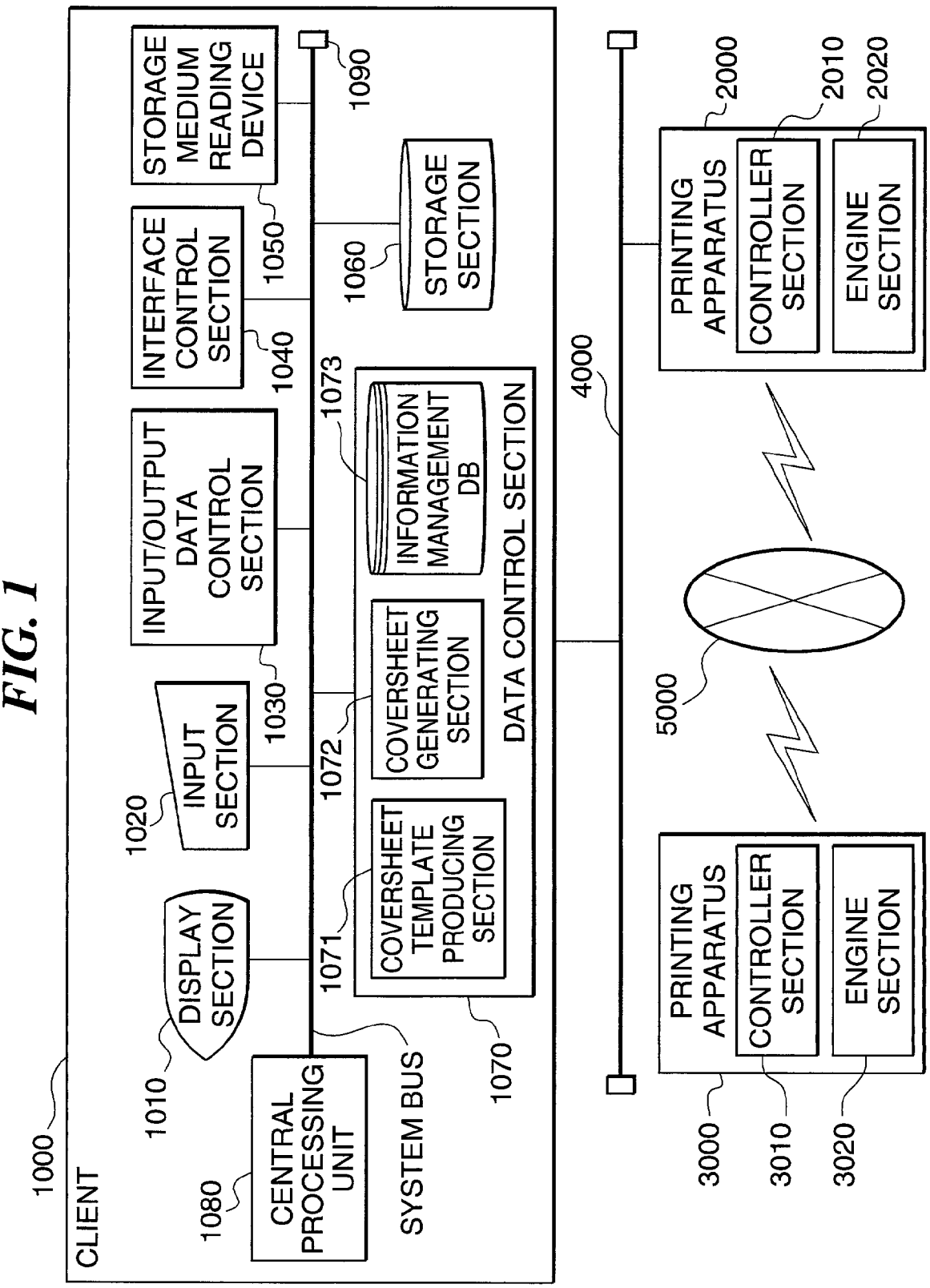
FIG. 1 is a block diagram showing the arrangement of a system comprised of a client serving as an information processing apparatus according to a first embodiment of the present invention and printing apparatuses.
Figure 2:
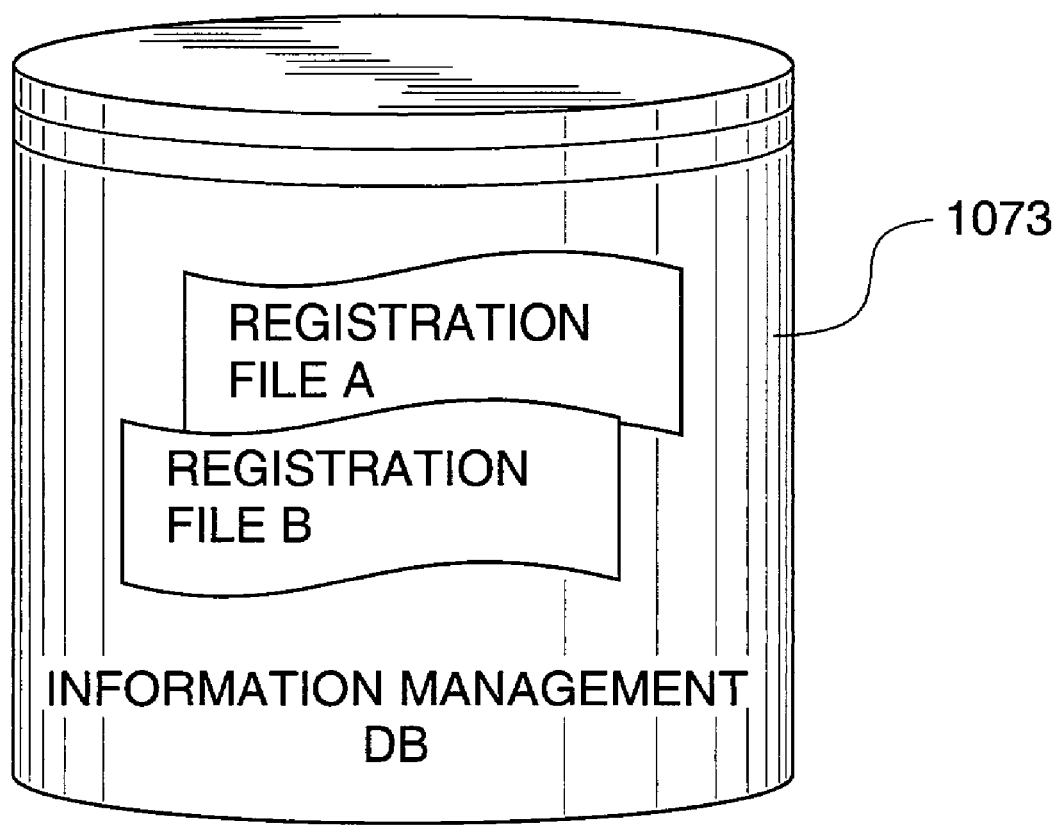
FIG. 2 is a diagram showing a state in which two coversheet template registration files are stored in an information management database DB of the client in FIG. 1.

FIG. 1 is a block diagram showing the arrangement of a system that is comprised of a client serving as an information processing apparatus according to a first embodiment of the present invention and printing apparatuses, and FIG. 2 shows a state in which two coversheet template registration files are stored in an information management database DB of the client in FIG. 1.

As shown in FIG. 1, the system is comprised of a client 1000, a plurality of printing apparatuses 2000, 3000, a communication network 4000 for connecting the client 1000 and the printing apparatus 2000 to each other, and a communication network 5000 for connecting the printing apparatus 2000 and the printing apparatus 3000 to each other.

The client 1000 is comprised of a personal computer that has a display section 1010, an input section 1020, an input/output data control section 1030, an interface control section 1040, a storage medium reading device 1050, a storage section 1060, a data control section 1070, a central processing unit 1080 (CPU or MPU) that controls the operation of the client as a whole, and a system bus 1090 that connects together the above-mentioned blocks.

The printing apparatus 2000 is comprised of a controller section 2010 and an engine section 2020, and has a so-called facsimile function of sending and receiving printing data via the communication network 5000. Similarly, the printing apparatus 3000 has a controller section 3010 and an engine section 3020, and has a so-called facsimile function of sending and receiving printing data via the communication network 5000.

The communication network 4000 is implemented by a LAN (Local Area Network). Alternatively, the communication network 4000 may be implemented by a communication network having a two-way serial interface such as the IEEE (Institute of Electrical and Electronics Engineers) 1394 and the USB (universal Serial Bus). The communication network 5000 is implemented by a communication network having a two-way interface for realizing a facsimile communication such as PSTN (Public Switched Telephone Network) and ISDN (Integrated Service Digital Network).

In the client 1000, the display section 1010 is comprised of a display device such as a CRT display and a liquid crystal display. The input section 1020 is comprised of a pointing device such as a keyboard and a mouse.

The data control section 1070 is comprised of a printer drive that has a so-called facsimile function of sending data to a designated address. The printer driver is a program that processes printing data generated by an application or the like so that the printing data can be processed by a printer, and controls the printing device 2000, between an operating system (OS) resident on the client 1000 and the printing apparatus 2000. The data control section 1070 includes a coversheet template-producing section 1071 for producing a coversheet template, a coversheet generating section 1072 for generating a coversheet, and an information management database (hereinafter referred to as "information management DB") 1073. The printer driver, i.e. the program constituting the data control section 1070 including those blocks is stored in the storage section 1060 or a storage medium that is read by the storage medium reading device 1050. As shown in FIG. 2, a registration file A and a registration file B, described later, are stored in the information management DB 1073. A detailed description of a process carried out by the data control section 1070 will be given later.

The storage medium reading device 1050 is capable of reading a program, such as a printer driver and a software calibration program, and image data, etc. recorded in a storage medium such as a FD (floppy (registered trademark) disk), a CD-ROM, a ROM, a DVD, and a magnetic tape.

Figure 3:
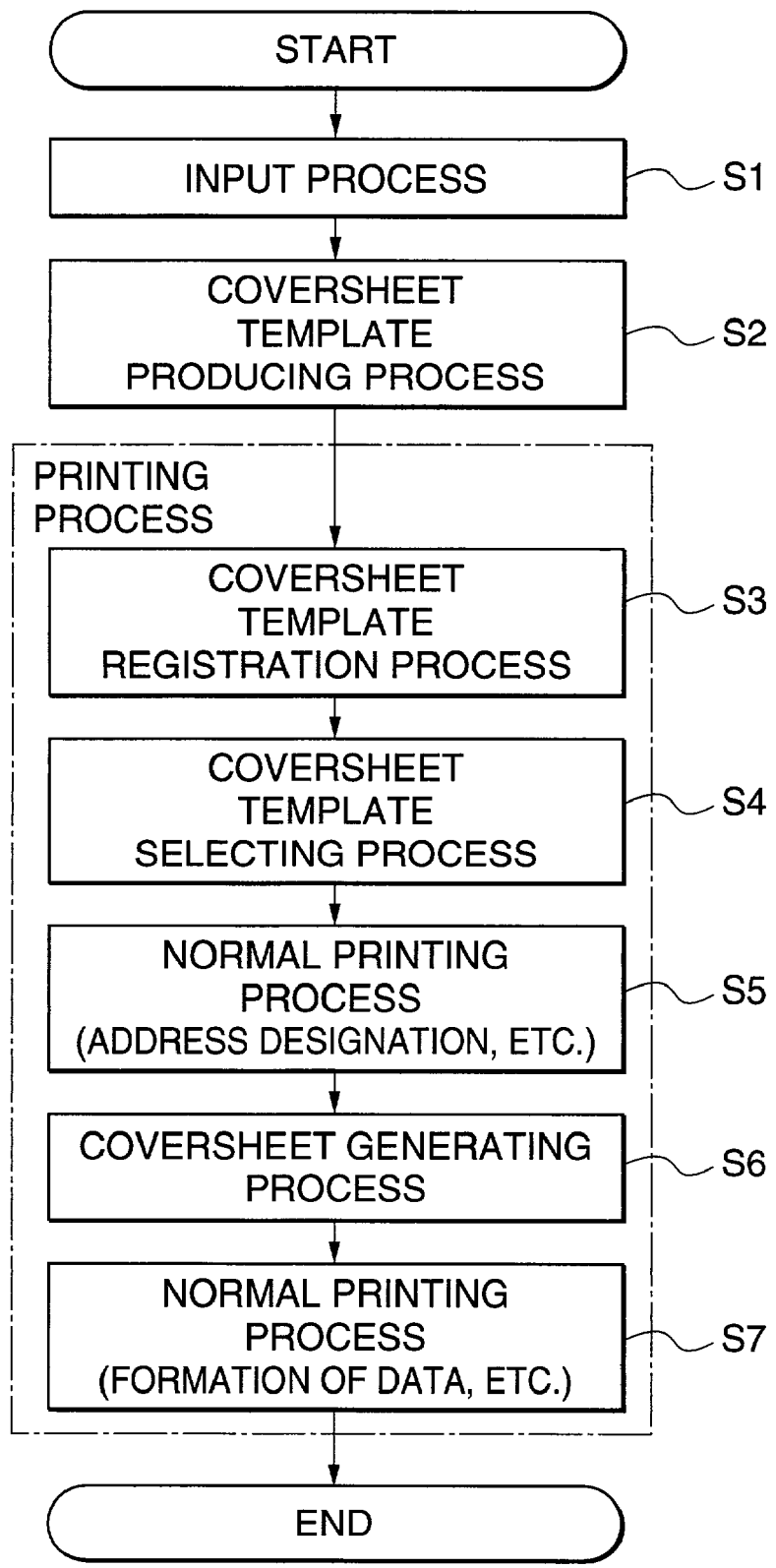
FIG. 3 is a flow chart showing the procedure for generating printing data with a coversheet, carried out by a data control section of the client in FIG. 1.

Referring next to FIG. 3, a description will now be given of the procedure for generating printing data with a coversheet added thereto, carried out by the data control section 1070 of the client 1000. FIG. 3 is a flow chart showing the procedure for generating printing data with a coversheet added thereto by the data control section 1070 of the client in FIG. 1. The following description is made based on an example in which the client 1000 generates printing data with a coversheet and the generated printing data is printed by the printing apparatus 2000 or is transmitted to the printing apparatus 3000.

First in a step S1, as shown in FIG. 3, the client 1000 carries out an input operation of giving an instruction for producing, registering, selecting, and generating a coversheet template that can be attached to printing data and the printing data. Specifically, on a menu screen displayed on the display section 1010 of the client 1000, an instruction for instructing the printing apparatus 2000 to carry out a printing process including a coversheet producing process, a coversheet template registration process, and a coversheet template selecting process is inputted via the input section 1020. The process proceeds to a step S2 wherein the coversheet then template producing section 1071 carries out the coversheet template producing process according to the inputted instruction. A detailed description will be given later of the process carried out by the coversheet template producing section 1071 in the step S2.

The coversheet generating section 1072 then carries out the printing process. In the printing process, a coversheet template is registered first in a step S3, and a coversheet template is then selected in a step S4. The process then proceeds to a step S5 wherein a normal printing process is carried out in which address information and the like are set. The process then proceeds to a step S6 wherein a coversheet is generated, and in the next step S7, a normal printing process is carried out in which printing data is formed. A detailed description will be given later of the printing process carried out by the coversheet generating section 1072.

Figure 8:
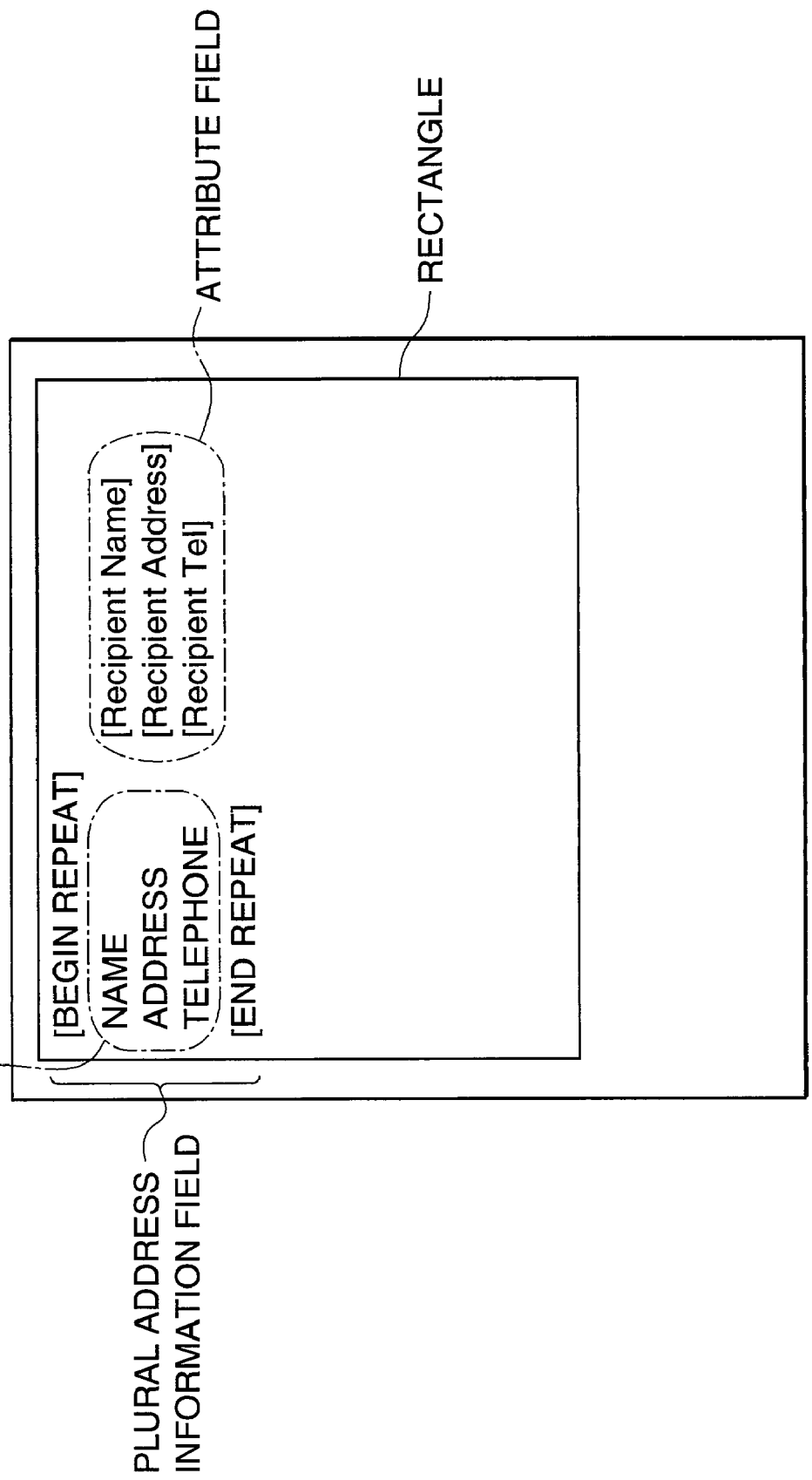
FIG. 8 is a diagram showing an example of a coversheet template produced by the coversheet template producing process in FIG. 4.
Figure 9:
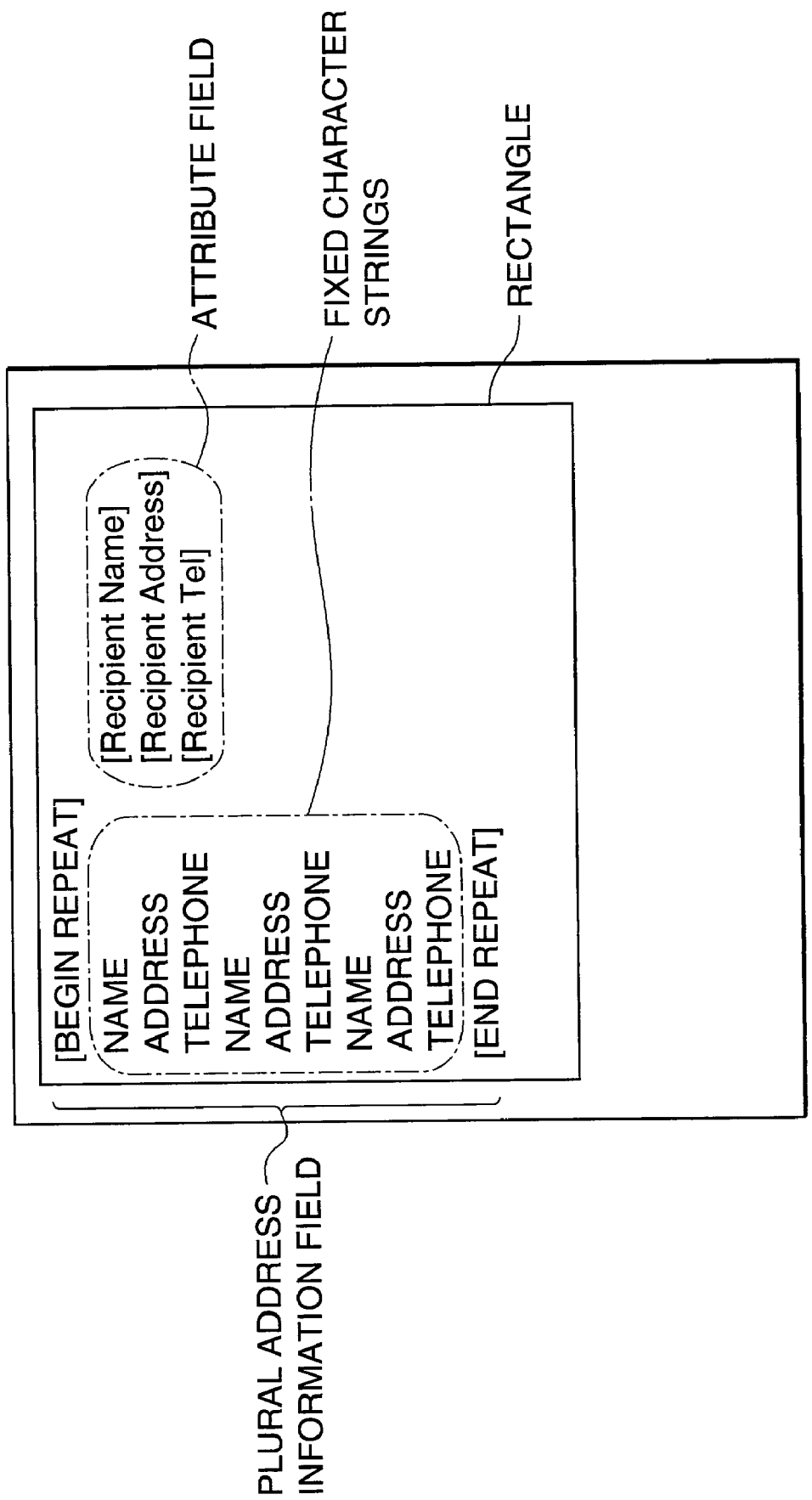
FIG. 9 is a diagram showing a state in which fixed character strings are expanded on the coversheet template in FIG. 8.

Referring next to FIGS. 4 to 10, a detailed description will be given of the process carried out by the coversheet template producing section 1071 and the process carried out by the coversheet generating section 1072 of the data control section 1070. FIG. 4 is a flow chart showing the details of the step S2 (the coversheet template producing process), FIGS. 5A and 5B is a flow chart showing the details of the printing process carried out by the coversheet generating section 1072 in FIG. 3, FIG. 6 is a diagram showing the structure of files stored in the registration file A in FIG. 2, FIG. 7 is a diagram showing the structure of files stored in the registration file B in FIG. 2, FIG. 8 is a diagram showing an example of a coversheet produced by the coversheet template producing process in FIG. 4, FIG. 9 is a diagram showing a state in which fixed character strings are expanded on the coversheet template in FIG. 8, and FIG. 10 is a diagram showing a coversheet that is produced based on the coversheet template in FIG. 8.

First, a description will be given of the coversheet template producing process (the above-mentioned step S2) carried out by the coversheet template producing section 1071.

In the step S2, the coversheet template producing process is carried out according to the instruction inputted in the step S1. In further detail, as shown in FIG. 4, it is determined first in a step S300 whether or not the inputted instruction is an instruction for carrying out a text field setting process. In this embodiment, the coversheet template is comprised of text data such as characters, graphics data such as figures, and image data to which is attached a BITMAP or JPEG (Joint Photographic Expert Group: color image compression method) file or the like, as is the case with ordinary drawing applications. The coversheet is provided with a text field where address information is to be expanded. The address information is information that is convertible into text data such as the names, addresses, telephone numbers, facsimile numbers, E-mail addresses, etc. of a sender and recipients. Thus, the address information is data that is expanded using the text field. Of course, the text field may have a nesting function of holding image data and graphics data.

According to the present embodiment, the text field is comprised of a text region (rectangle) and text data including attribute information and fixed character strings specified by a plural address information field as shown in FIG. 8, for example.

Therefore, if the inputted instruction is the instruction for carrying out the text field setting process, that is, if the text region (rectangle) is set as shown in FIG. 8, the process proceeds to a step S301 wherein it is determined whether or not a plural address information field setting process is to be carried out to set plural address information. The plural address information is a plurality of address information representing a plurality of addresses to which the same transmission data is transmitted, just like plural address information representing a plurality of addresses in broadcast transmission via facsimile or E-mail.

When it is determined that the plural address information field setting process is to be carried out, the process proceeds to a step S302 to set a plural address information field. According to the present embodiment, a plural address information field for specifying an attribute field where plural address information is to be expanded is set as defined between [BEGIN REPEAT] and [END REPEAT], and the name, address, and telephone number of a recipient such as [Recipient Name], [Recipient Address], and [Recipient Tel] are defined as the attribute field for each of the plural address information to be expanded.

The attribute field is roughly divided into two types. One type is certain specific character strings or command on the coversheet template, which is replaced by actual information when a coversheet is produced. In the present embodiment, this type of attribute field corresponds to a field for attributes such as [Recipient Name], [Recipient Address], and [Recipient Tel] in FIG. 8. These attributes are set address information which is replaced by, for example, <AAA>, <aaaaaaaaaaaa>, <1111111111>, etc. as shown in FIG. 10. Address information corresponding to these attributes is stored in association with the attributes in the information management DB 1073 and is read out from the information management DB 1073. The other type is certain specific character strings or commands on the coversheet template, which indicate a certain expanding method and are not replaced by actual information when a coversheet is produced. In the present embodiment, this type of attribute field corresponds to [BEGIN REPEAT] and [END REPEAT] in FIG. 8, which indicate a method of repeatedly expanding address information linked to the attribute field therebetween in the rectangular text field a number of times corresponding to the number of the address information.

The process then proceeds to a step S303 wherein it is determined whether or not fixed character strings are to be set in the plural address information field. If it is determined that the fixed character strings are to be set in the plural address information field, the process returns to the step S300. On the other hand, if it is determined that the fixed character strings are to be set in the plural address information field, the process proceeds to a step S304 to set the fixed character string strings. The fixed character strings are different from the character strings as the attribute field replaced by actual information, and have meanings by themselves. In the present embodiment, <Name>, <Address>, and <Telephone Number> as shown in FIG. 8 correspond to these fixed character strings. When a coversheet is produced, these character strings are expanded as they are on the coversheet template without being replaced.

If it is determined in the step S300 that the inputted instruction is not the instruction for carrying out the text field setting process, the process proceeds to a step S305 wherein it is determined whether or not the production of the coversheet template is to be terminated. If it is determined that the production of the coversheet template is not to be terminated, the process proceeds to a step S306 wherein a setting process other than the plural address information field setting process is carried out, and the process then returns to the step S300. If it is determined in the step S301 that the plural address information field setting process is not to be carried out, the process proceeds to the step S306 wherein a setting process other than the plural address information field setting process is carried out, and the process then returns to the step S300.

The above described processes are repeated to generate a proper coversheet template.

If it is determined in the step S305 that the production of the coversheet template is to be terminated, the process proceeds to a step S307 wherein the generated coversheet template is stored or destroyed as is the case with a terminating process for a normal drawing application. In the present embodiment, to store the coversheet template generated as shown in FIG. 8, the coversheet template is registered in the registration file A in the information management DB. FIG. 6 shows an example of the structure of generated coversheet templates stored in the registration file A. The generated coversheet template may be managed using a disk file system, a registry, or the like provided in the OS without using the information management DB 1073.

Figure 5A:
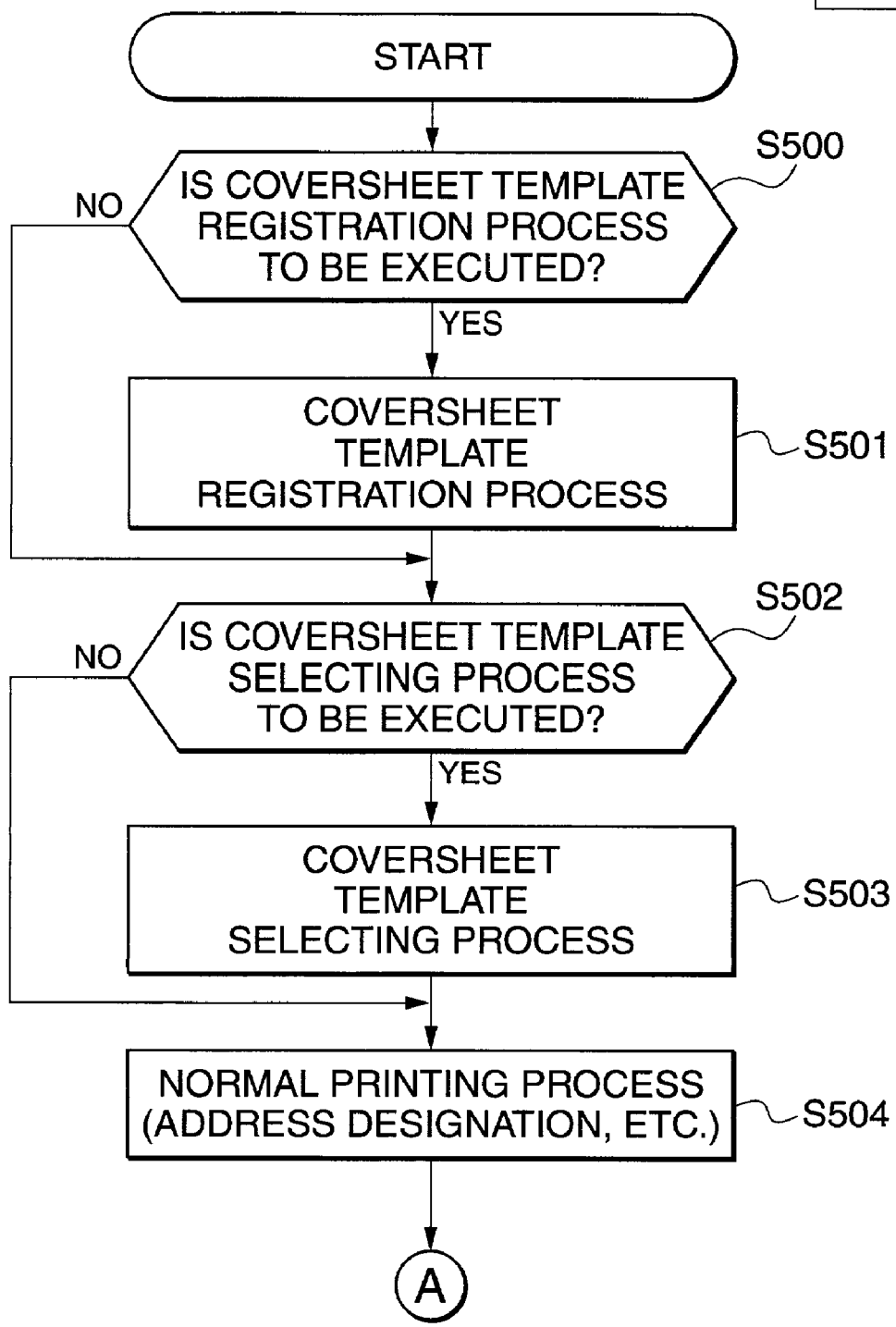
FIGS. 5A and 5B is a flow chart showing the details of a printing process carried out by a coversheet generating section 1072.
Figure 5B:
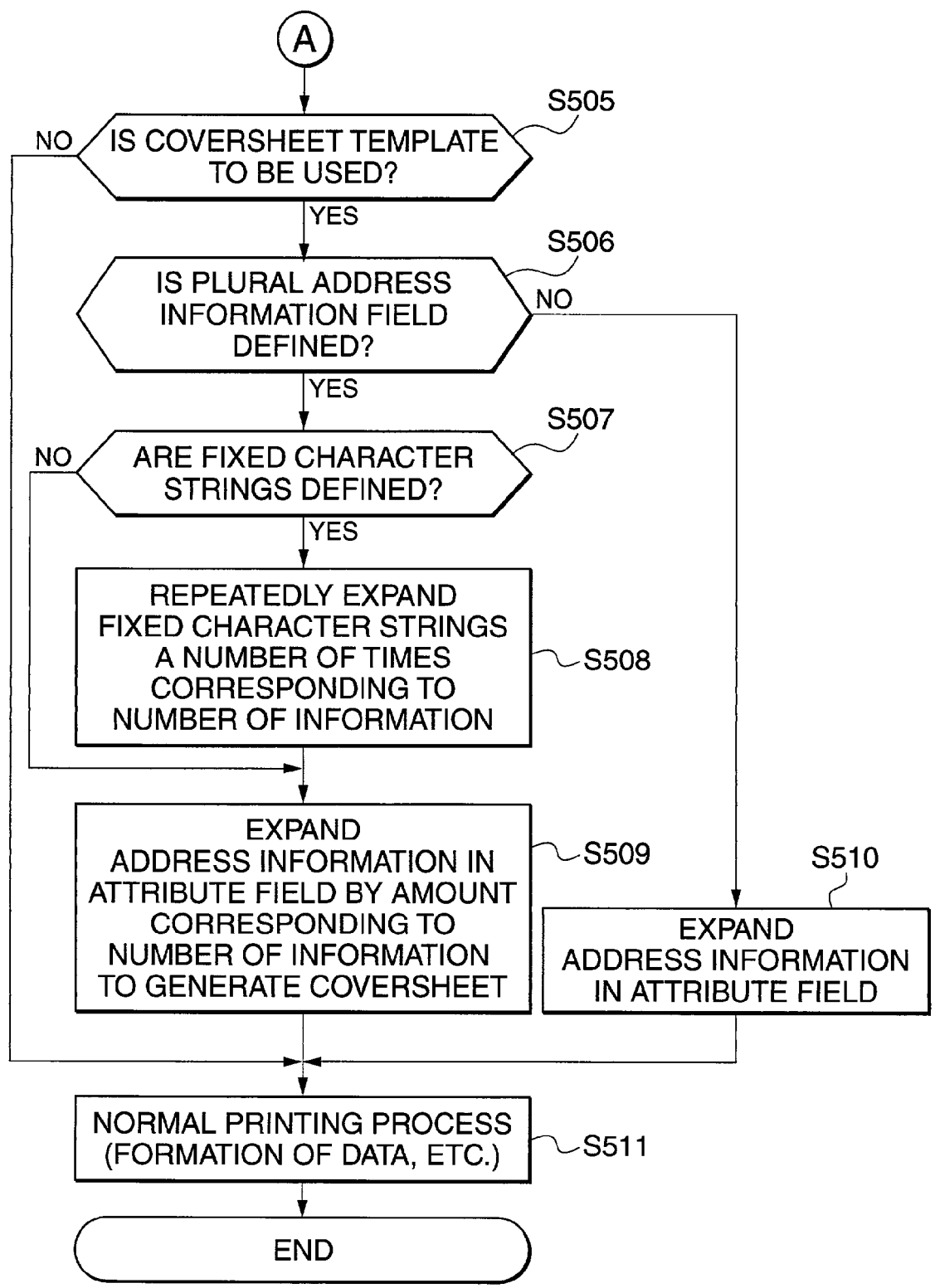

Referring next to FIGS. 5A and 5B, a detailed description will be given of the printing process carried out by the coversheet generating section 1072. FIGS. 5A and 5B is a flow chart showing the details of the printing process carried out by the coversheet generating section 1072 in FIG. 3.

As shown in FIGS. 5A and 5B, in the printing process carried out by the coversheet generating section 1072, it is determined first in a step S500 whether or not the coversheet template registration process is to be carried out. If it is determined that the coversheet template registration process is to be carried out, the process proceeds to a step S501 wherein the coversheet template is registered in the registration file B in the information management DB 1073. FIG. 7 shows the structure of coversheet templates stored in the registration file B. The process then proceeds to a step S502. On the other hand, if it is determined that the coversheet template registration process is not to be carried out, the process proceeds to the step S502 while skipping the step S501. The steps S500 and S501 correspond to the step S3 (the coversheet template registration process) in FIG. 3.

In the step S502, it is determined whether or not the coversheet template selecting process is to be carried out. If it is determined that the coversheet template selecting process is to be carried out, the process proceeds to a step S503 wherein a desired coversheet template is selected from the registration file B in the information management DB 1073. The process then proceeds to a step S504. For the sake of convenience, in the instant case it is assumed that the coversheet template in FIG. 8 is selected. On the other hand, if it is determined that the coversheet template selecting process is not to be carried out, the process proceeds to the step S504 while skipping the step S503. The steps S502 and S503 correspond to the step S4 (the coversheet template selecting process) in FIG. 3.

In the step S504, a normal printing process is carried out to designate address information such as names, addresses, and telephone numbers, the number of times the address information is to be repeated, the layout, the paper size, and the like. In this example, address information for three recipients is set as shown in FIG. 9, but in the present embodiment, on the coversheet template the address information is set as shown in FIG. 8. The step S504 corresponds to the step S5 in FIG. 3.

The process then proceeds to a step S505 wherein it is determined whether or not the coversheet template is to be used in generating printing data. If it is determined that the coversheet template is to be used, the process proceeds to a step S506 wherein it is determined whether or not a plural address information field is defined on the selected coversheet template. If it is determined that the plural address information field is defined on the selected coversheet template, the process proceeds to a step S507 wherein it is determined whether or not fixed character strings are set in the plural address information field.

If it is determined that fixed character strings are set in the plural address information field, the process proceeds to a step S508 wherein the fixed character strings are repeatedly expanded (drawn) on the text field a number of times corresponding to the number of plural address information.

In the example shown in FIG. 8, since <Name>, <Address>, and <Telephone Number> are the fixed character strings, and the plural address information is for three recipients, the fixed character strings comprised of <Name> <Address>, and <Telephone Number> are repeatedly expanded three times. The process then proceeds to a step S509. On the other hand, if it is determined that no fixed character string is set in the plural address information field, the process proceeds to the step S509 while skipping the step S508.

In the step S509, the address information set in the step S504 is repeatedly expanded on the text field, in which the plural address information field is defined, according to the attribute field and by an amount corresponding to the number of the address information. In the present embodiment, the address information for three recipients is expanded as shown in FIG. 10. In this manner, a coversheet is produced based on the coversheet template. The process then proceeds to a step S511.

If it is determined in the step S506 that no plural address information field is defined, the process proceeds to a step S510 wherein data corresponding to the address information specified in the text field is expanded, and the process then proceeds to the step S511.

If it is determined in the step S505 that the coversheet template is not to be used, the process proceeds to the step S511. The steps S505 to S510 correspond to the step S6 (the coversheet generating process) in FIG. 3.

In the step S511, text data to which the coversheet is added is expanded to generate printing data with the coversheet. The step S511 corresponds to the step S7 in FIG. 3. The printing process is then terminated.

The printing data with the coversheet generated in the above described manner (e.g. PDL data) is transmitted to the printing apparatus 2000 via the communication network 4000 and is then transmitted from the printing apparatus 2000 to the printing apparatus 3000 via the communication network 5000. The printing apparatus 2000 analyzes the printing data with the coversheet transmitted from the client 1000, expands it into an image, and converts the image into a facsimile format (image data having a resolution corresponding to the standards of facsimile), and transmits the image data with transmission data to the printing apparatus 3000 according to a transmission command including the address information from the client 1000 by a known facsimile procedure. The printing apparatus 3000 receives the data from the printing apparatus 2000 and prints out the data as visible data (as the case may be, the data is held in a memory and fetched at another terminal).

As a result, according to the present embodiment, it is possible to improve the operability in producing the coversheet in which a plurality of address information is written, and prevent the generation of a coversheet having an improper layout caused by the inconsistency in number between address information and fixed character strings.

It should be noted that a client/server system may be connected to the present system. More specifically, the coversheet template producing section 1071, the coversheet generating section 1072, and the information management DB 1073 which are provided in the client 1000 may be separately or discretely provided for functioning independently of one another.

Further, the information management DB 1073 may be provided in the printing apparatus 2000, and the information management Db 1073 may be accessed through communication between the client 1000 and the printing apparatus 2000 via the communication network 4000.

Further, although in the above described embodiment, the printing data is once transmitted to the printing apparatus 2000 and then transmitted by facsimile to the printing apparatus 3000, this is not limitative, but the printing data may be transmitted from the client 1000 directly to the printing apparatus 3000.

Further, the steps S500 and S501 in FIGS. 5A and 5B may be omitted, and all the coversheet templates stored in the terminating process step S305 in FIG. 4 may be subjected to the template selecting process in the step S503 in FIGS. 5A and 5B.

Further, although according to the present embodiment, the transmission data from the client is transmitted after it is converted into facsimile data by the printing apparatus 2000, this is not imitative, but the transmission data may be transmitted in a printing data format without being expanded into an image if the printing apparatus 3000 can interpret the transmission data in the printing data format generated by a client computer. In this case, the transmission data is transmitted after whether or not the printing data format is usable is confirmed by the printing apparatus 2000 (or the client 1000) and the printing apparatus 3000 when they negotiate the start of communication.

Further, although a printing method employed by the printing apparatuses 2000, 3000 is not mentioned in the above description of the present embodiment, various kinds of printing methods based on electorophotograpic process, inkjet process, thermal transfer process, thermal process, electrostatic process, and discharge breakdown process may be adopted as the printing method used by the printing apparatuses 2000, 3000.

(Second Embodiment)

Figure 11:
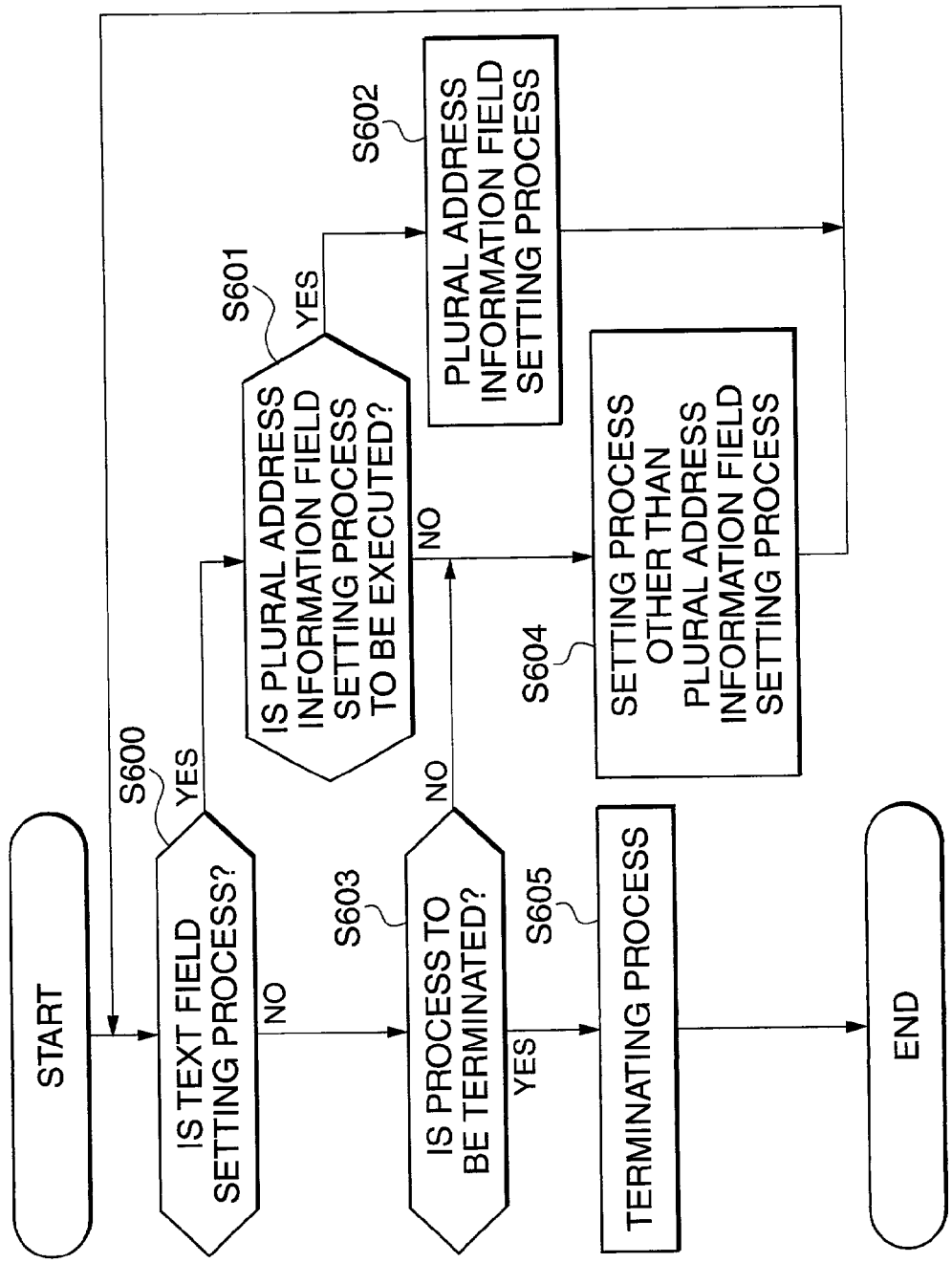
FIG. 11 is a flow chart showing the details of a coversheet template producing process carried out by a coversheet template producing section 1071 according to a second embodiment of the present invention.
Figure 12:
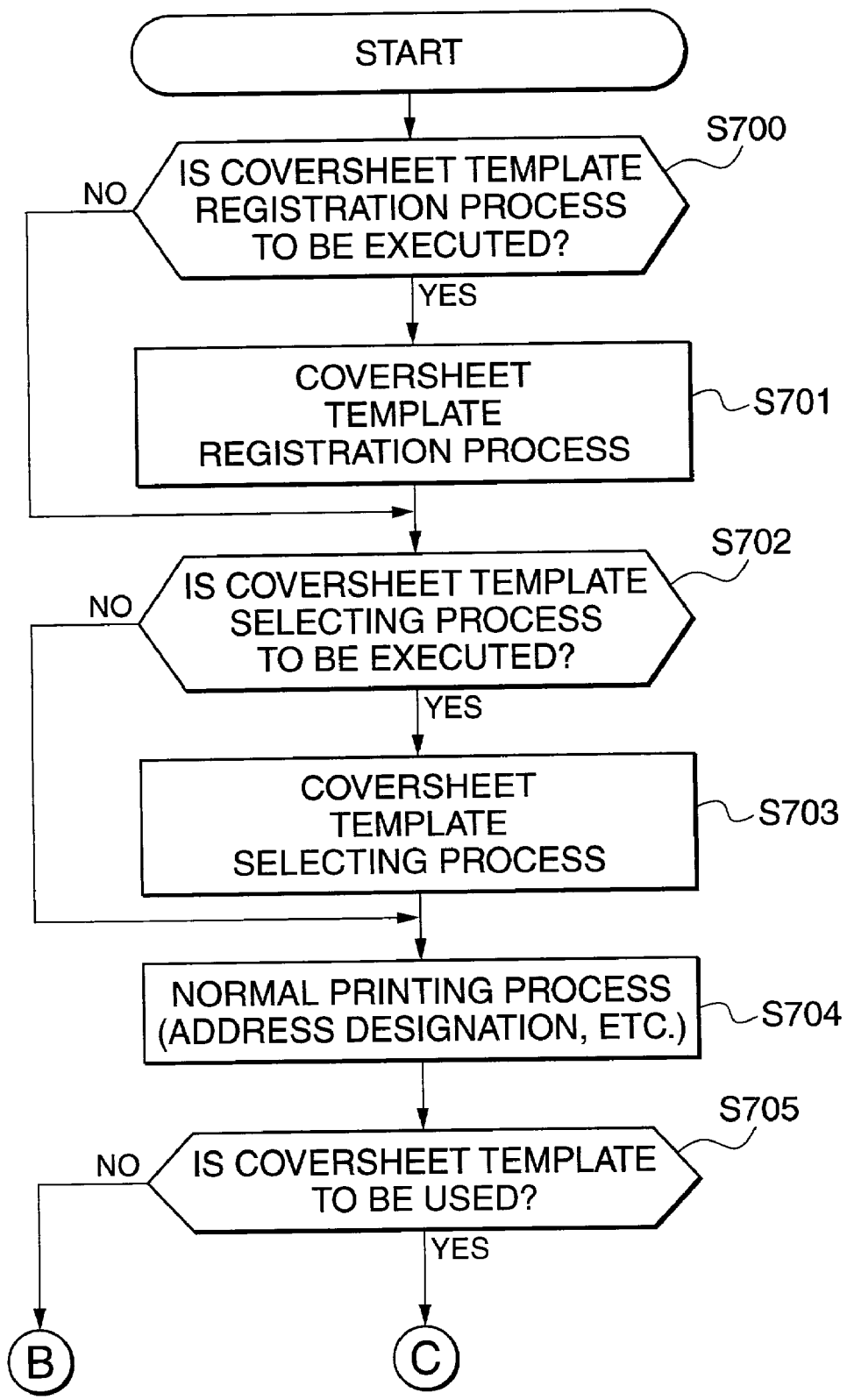
FIG. 12 is a flow chart showing the details of a printing process carried out by a coversheet generating section 1072 according to the second embodiment.
Figure 13:
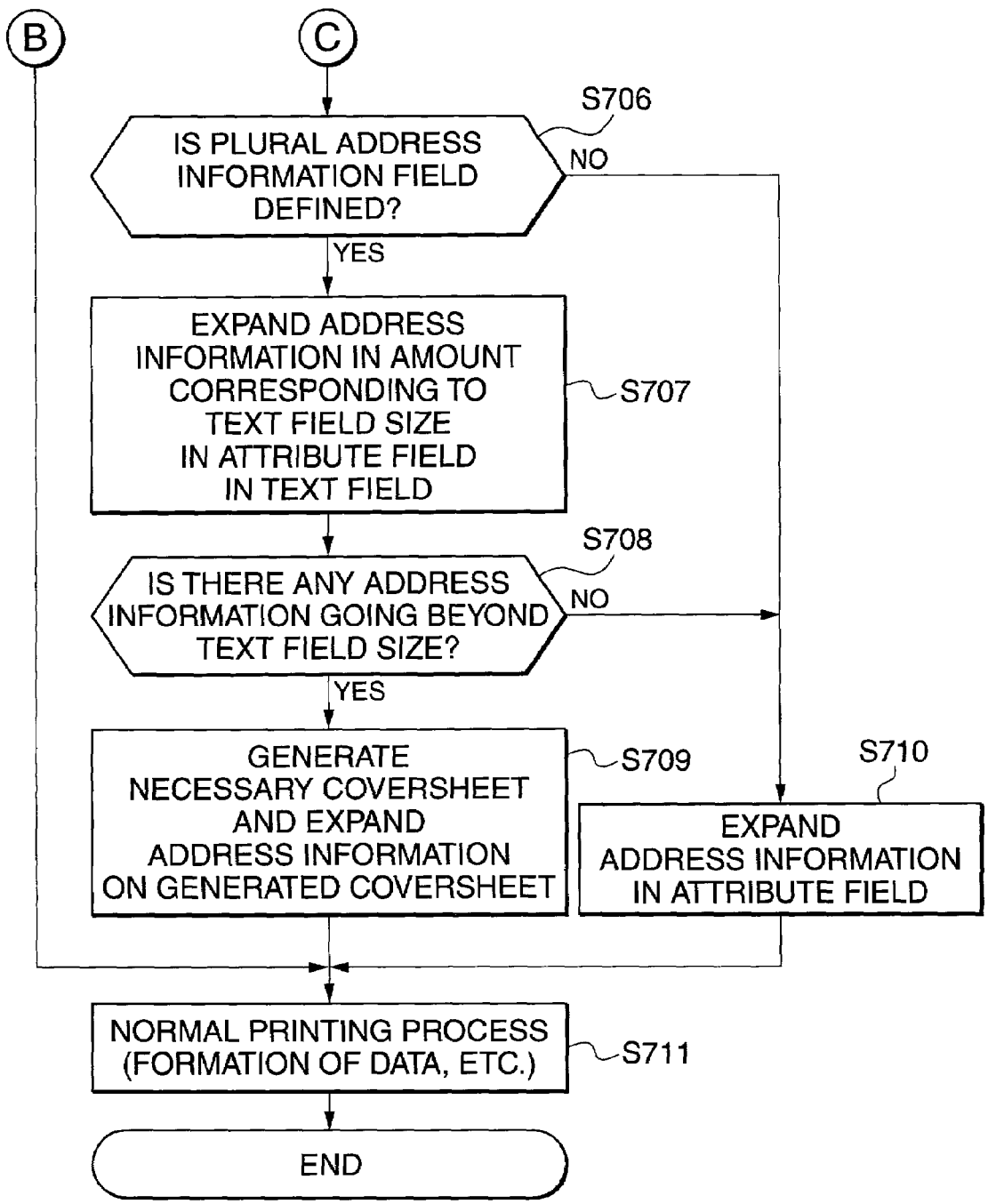
FIG. 13 is a flow chart continued from the flow chart of FIG. 12.
Figure 14:
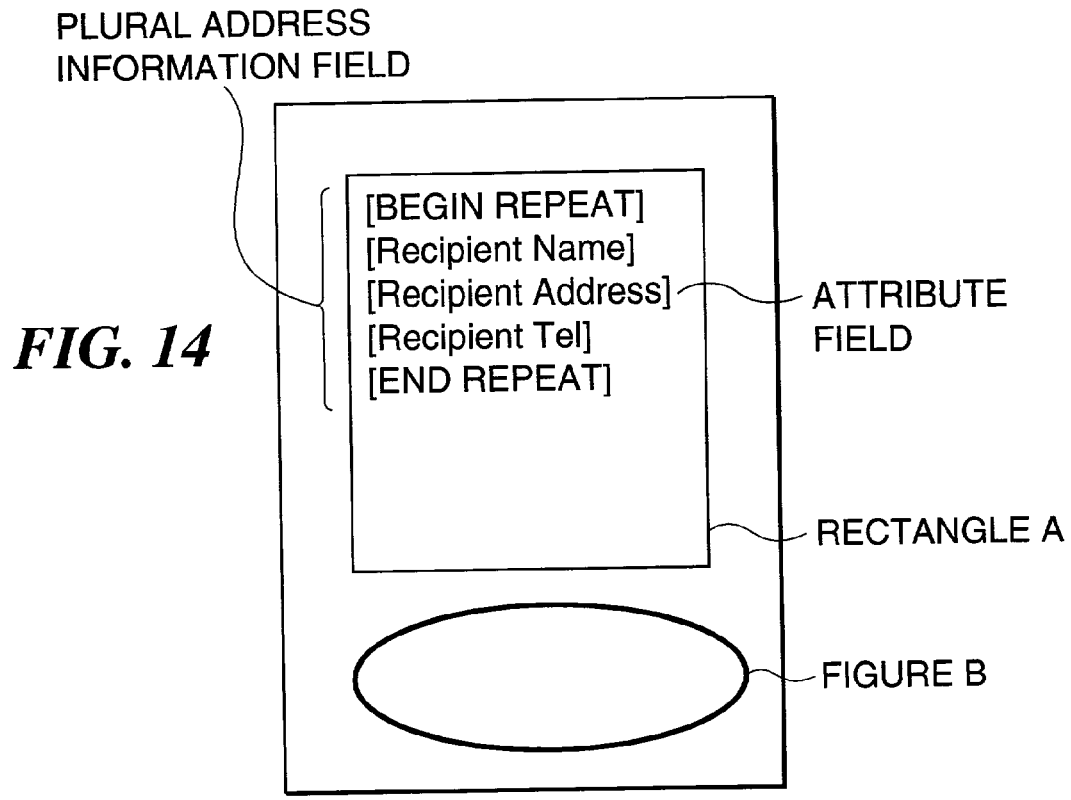
FIG. 14 is a diagram showing an example of a coversheet template produced by the coversheet template producing process according to the second embodiment.
Figure 15:
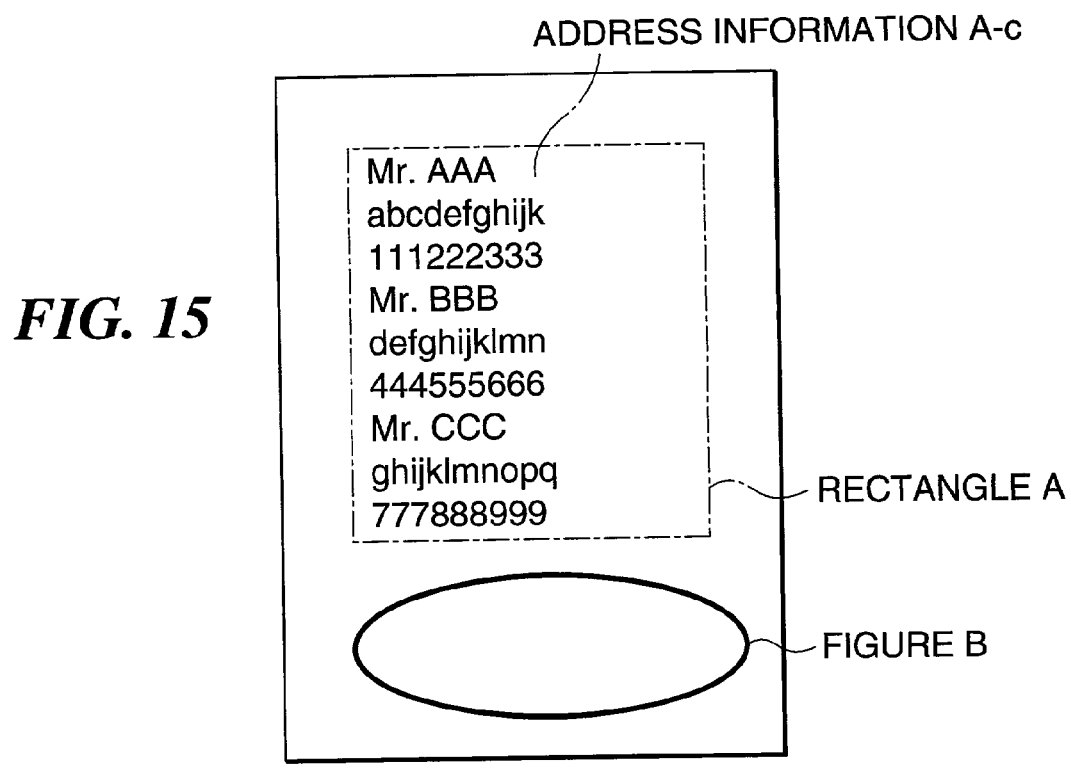
FIG. 15 is a diagram showing a first page of a coversheet produced based on the coversheet template in FIG. 14.
Figure 17:
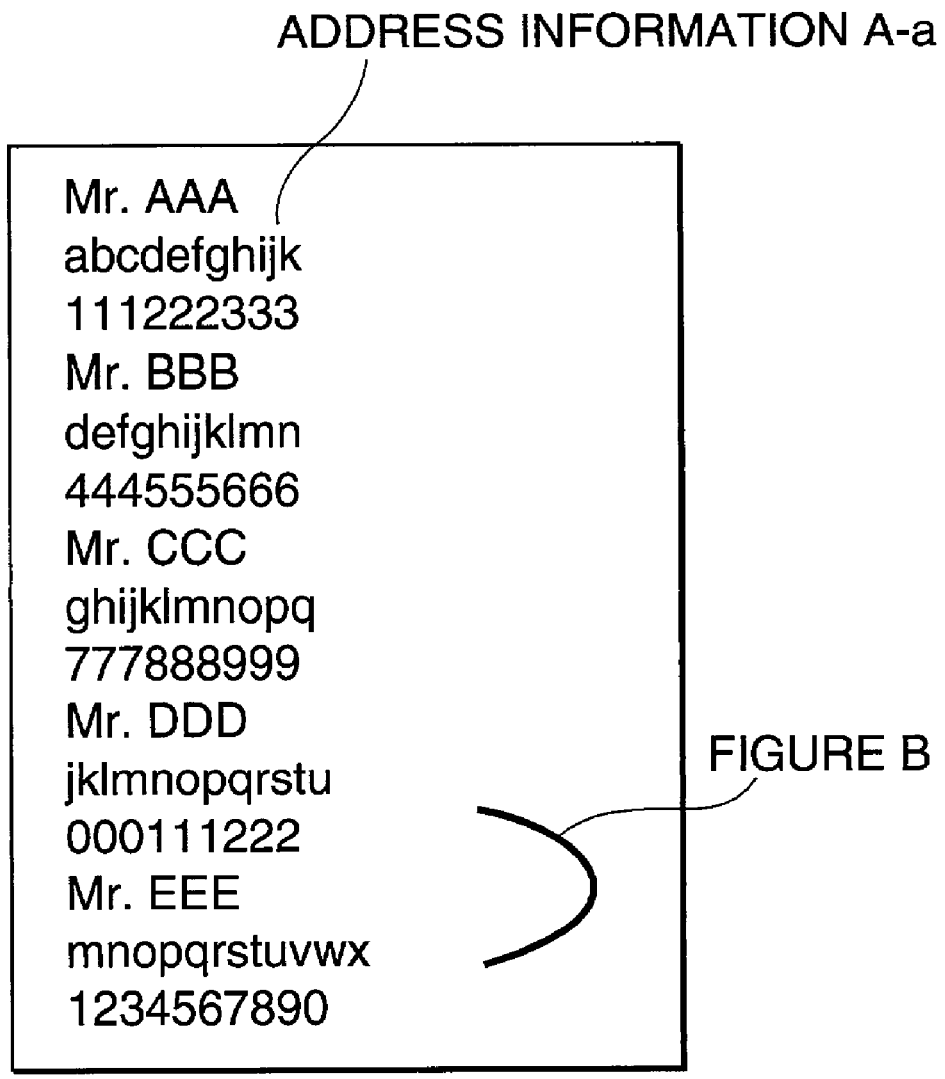
FIG. 17 is a diagram showing a first page of an example of a coversheet that is produced by expanding address information in a conventional method.

Referring to FIGS. 11 to 18, a description will now be given of a second embodiment of the present invention. FIG. 11 is a flow chart showing the details of a coversheet template producing process carried out by the coversheet template producing section 1071 according to the second embodiment of the present invention, FIG. 12 is a flow chart showing the details of a printing process carried out by the coversheet generating section 1072 according to the second embodiment, FIG. 13 is a flow chart continued from the flow chart of FIG. 12, FIG. 14 is a diagram showing an example of a coversheet template produced by the coversheet template producing process according to the second embodiment, FIG. 15 is a diagram showing a first page of a coversheet produced based on the coversheet template in FIG. 14, FIG. 16 is a diagram showing a second page of the coversheet in FIG. 15, FIG. 17 is a diagram showing a first page of an example of a coversheet that is produced by expanding address information in a conventional method, and FIG. 18 is a diagram showing a second page of the coversheet in FIG. 17.

It should be noted that the arrangement of the present embodiment is identical with that of the first embodiment, and a description thereof is omitted herein. Moreover, the procedure for generating printing data with a coversheet by the data control section 1070 according to the present embodiment is identical with the procedure shown in the flow chart of FIG. 3, and a description thereof is omitted herein.

According to the present embodiment, when a coversheet to be added to transmission data is generated using a coversheet template, a plural address information field is defined in a text field on the coversheet template, and the plural address information is expanded according to the size of the text field to generate the coversheet. Specifically, if there is any address information going beyond the size of the text field, one or more coversheet required for writing part of the address information that cannot be housed in the text field are additionally generated. Further, according to the present embodiment, a coversheet provided with graphics data added thereto is generated without setting any fixed character strings.

A detailed description will now be given of a control procedure according to the present embodiment.

First, a user inputs an instruction via the display section 1010 and the input section 1020 of the client 1000 to instruct the client 1000 to carry out the coversheet template producing process, the printing process (the coversheet template registration process, the coversheet template selecting process, the printing process (e.g. address designation), the coversheet generating process, the printing process (e.g. formation of data)) to thus produce transmission data with a coversheet that is to be transmitted to the printing apparatus 2000 (step S1). The coversheet template producing section 1071 then carries out the coversheet template producing process according to the inputted instruction (step S2).

In the step S2, as shown in FIG. 11, it is determined first in a step S600 whether or not the inputted instruction is an instruction for carrying out a text field setting process. In the present embodiment, it is assumed that the text field is comprised of a text region (rectangle A), and text data including attribute fields such as a plural address information field as shown in FIG. 14, for example. Thus, the text region (rectangle A) as shown in FIG. 14 is set if the determination result is positive (yes) in the step S600. It is then determined in a step S601 whether or not the i a plural address information field setting process is to be carried out. The plural address information is information representing a plurality of addresses to which the same transmission data is transmitted, just like plural address information representing a plurality of addresses in so-called broadcast transmission via facsimile and E-mail. The process proceeds from the step S601 with a positive determination result (yes).

The process then proceeds to a step S602 to set the plural address information field. In the present embodiment, a plural address information field as indicated by [BEGIN REPEAT] and [END REPEAT] for expanding the plural address information, and the names, addresses, and telephone numbers of recipients as indicated by [Recipient Name], [Recipient Address], and [Recipient Tel] as an example of the attribute field of the plural address information to be expanded, which are shown in FIG. 14, are defined. The attribute field is roughly divided into two types.

One type is certain specific character strings or command on the coversheet template, which is replaced by actual information when a coversheet is produced. In the present embodiment, this type of attribute field corresponds to a field for attributes such as [Recipient Name], [Recipient Address], and [Recipient Tel] in FIG. 14. These attributes are set address information which is replaced by <Mr. AAA>, <abcdefghijk>, <111222333>, for example, as shown in FIG. 15.

The other type is specific character strings or command on the coversheet template, which indicates a certain expansion method without being replaced by actual information when a coversheet is produced. In the present embodiment, [BEGIN REPEAT] and [END REPEAT] in FIG. 14 corresponds to the character strings or command. These character strings indicate a method of repeatedly expanding the address information linked to the attribute field therein in the text field of the rectangle A a number of times corresponding to the number of the address information. FIGS. 15 and 16 show examples of the results of the expansion.

If the determination result is negative (no) in the step S600, the process proceeds to a step S603 wherein it is determined whether or not a terminating process is to be carried out for the production of a coversheet template. If the determination result is negative (no) in the step S603, or if the determination result in the step S601 is negative (no), i.e. it is determined that the plural address information field setting process is not to be carried out, a setting process other than the plural address information field setting process is carried out in a step S604. In the example shown in FIG. 14, a figure B is set as graphics data in a setting process other than the plural address information field. The above processes are repeated to generate a proper coversheet template.

On the other hand, if it is determined in the step S603 that the terminating process is to be carried out for the coversheet template, the process proceeds to a step S605 wherein the generated coversheet template is stored or destroyed as is the case with a normal draw application terminating process. In the present embodiment, the coversheet template generated as shown in FIG. 14 is registered in the registration file A in the information management DB 1073 (refer to FIGS. 2 and 6). It goes without saying that the generated coversheet template may alternatively be managed using a disk file system or a registry provided in an OS (operating system) without using the information management DB 1073.

A description will now be given of the coversheet template registration process (step S3 in FIG. 3) according to the present embodiment.

As shown in FIG. 12, in the coversheet template registration process, it is determined first in a step S700 whether or not the coversheet template registration process is to be carried out. In the instant case, the determination result is positive (yes). In the next step S701, the coversheet template is registered in the registration B (refer to FIGS. 2 and 7) in the information management DB 1073.

If it is determined in the step S700 that the inputted instruction is not the instruction for carrying out the coversheet template registration process, or after the coversheet template is registered, it is determined in a step S702 whether the inputted instruction is an instruction for carrying out the coversheet template selecting process (step S4 in FIG. 3). In the instant case, the determination result is positive (yes). Subsequently, in a step S703, a desired coversheet template is selected from the registration file B in the information management DB 1073. For the sake of convenience, the present embodiment assumes that the coversheet template in FIG. 14 is selected.

If the determination result is negative in the step S702 and if the coversheet template is selected in the step S703, in a step S704 a normal printing process (e.g. address designation) is carried out by a printer driver having a normal facsimile function of designating address information such as the name, address, and telephone number, the layout, the paper size, etc. The present embodiment assumes that address information for eight recipients are set as shown in FIGS. 15 and 16, for example.

The process then proceeds to a step S705 wherein it is determined whether or not a coversheet template is to be used in generating printing data. If the determination result is positive (yes), the process proceeds to a step S706 wherein it is determined whether or not a plural address information field is defined as an attribute field on the selected coversheet template. If the determination result is positive (yes), the process proceeds to a step S707 wherein the address information set in the step S704 is expanded on the text field, in which the plural address information field is defined, according to the attribute field and by an amount corresponding to the number of the set address information.

It is then determined in the next step S708 whether or not there is any address information going beyond the size of the defined text field. The present embodiment assumes that address information for five recipients among the set address information for eight recipients cannot be housed in the text field, and thus, the determination result is positive (yes) in the step S708. In the next step S709, a coversheet required for expanding the address information for five recipients among the address information for eight recipients is generated. For example, a one-page coversheet shown in FIG. 16 is generated in addition to the coversheet in FIG. 15, and the address information for the five recipients not housed as mentioned above is expanded on the coversheet in FIG. 16. It goes without saying that in the present embodiment, data in the attribute field other than the plural address information field is expanded. The additionally generated coversheet may alternatively be generated using a coversheet template registered in terms of design, or may be generated using a coversheet template that is designed differently from the one in FIG. 15 as shown in FIG. 16.

For reference, a description will now be given of an example in which address information for eight recipients is set on the coversheet template defined as shown in FIG. 8 and expanded in a conventional method. In the conventional case, the rectangle A as the text field is ignored as shown in FIG. 17 and 18, and the address information fills up a space for the figure B in FIG. 17. On the other hand, according to the present embodiment, if there is any address information going beyond the size of the defined text field, a coversheet required for expanding the address information for five recipients that cannot be housed in the text field is additionally generated to thereby prevent the address information from filling up the space for the figure B attached to the coversheet.

On the other hand, if the designated address information does not go beyond the size of the text field, data in the attribute field other than the plural address information field is expanded in a step S710. Finally, if it is determined in the step S705 that the coversheet is not to be-used, or after the process in the step S709 or S70 is completed, data outside the attribute field such as the figure B and text data other than the coversheet are expanded to generate printing data.

The transmission data in a printing data format, such as PDL data, generated in the above described manner is analyzed, and is expanded into an image according to the result of the analysis by the printing apparatus 2000. The image is then converted into a facsimile format (image data having a resolution corresponding to the facsimile standards), and the transmission data as well as the image data are transmitted to the printing apparatus 3000 according to a transmission command including the address information transmitted from the client computer by a known facsimile procedure.

As described above, according to the present embodiment, when producing transmission data with a coversheet that is transmitted to the printing apparatus 3000 via the printing apparatus 2000, the data control section 1070 of the client 1000 having a function of linking address information to a coversheet provides control for defining a plural address information field in a text field on a coversheet template and provides control for expanding the plural address information according to the size of the text field in order to control a method of forming a coversheet from the address information field defined on the coversheet template, the coversheet template, and the address information. This realizes the excellent operability and flexibility in generating a coversheet that is to be attached to transmission data.

Although the object of the resent invention is accomplished by installing a program code of software realizing the functions of the above described embodiments, the object of the present invention may be accomplished by supplying a system or apparatus with a storage medium storing the program code of software and causing a computer (or CPU or MPU) of the system or apparatus to read and execute the program code stored in the storage medium.

In this case, the program code itself read out from the storage medium realizes the functions of the above described embodiments, and the storage medium storing the program code constitutes the present invention.

The storage medium for recording the program code may be a floppy (registered trademark) disk, a hard disk, an optical memory disk, a magneto-optical disk, a CD-ROM, a CD-R, a DVD-ROM, a magnetic tape, a nonvolatile memory card, or a ROM, for instance.

Further, the present invention may be applied to either a system comprised of a plurality of apparatuses or an apparatus comprised of single equipment. Further, the present invention encompasses a case in which a program is supplied to a system or apparatus.

In this case, a storage medium storing a program for implementing the present invention constitutes the present invention. Reading the program from the storage medium into a system or apparatus causes the system or apparatus to operate in a predetermined manner.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information processing apparatus having a function of adding a coversheet to data, comprising:
   a defining unit that defines a plural information field in a text field provided on a coversheet template and in which information is to be written, the plural information field being for setting therein attributes specifying the information to be written in the text field, and a number of the information to be written;
   a fixed character string setting unit that sets at least one fixed character string to be written in the text field of the coversheet template, in the coversheet template in association with the information specified by the attributes set in the plural information field;
   a fixed character string expanding unit that repeatedly expands the at least one fixed character string on the text field of the coversheet template a number of times corresponding to the set number of the information;
   an information expanding unit that repeatedly expands the information specified by the attributes set in the plural information field a number of times corresponding to the set number of the information; and
   an adding unit that adds the coversheet template having the at least one fixed character string and the information expanded on the text field, as a coversheet to data.

2. An information processing apparatus as claimed in claim 1, further comprising a storage unit that stores the information in association with the attributes, and wherein the information expanding unit reads out the information corresponding to the attributes set in the plural information field from said storage unit and expands the read out information.

3. An information processing apparatus as claimed in claim 1, wherein the information to be written in the text field of the coversheet template comprises address information, and the at least one fixed character string comprises at least one character string indicating that the information comprises address information.

4. An information processing apparatus as claimed in claim 1, further comprising a registration unit that registers at least one coversheet template in which the plural information field is defined in the text field thereof and the at least one character string is set, and a selecting unit that selects a desired coversheet template from the registered at least one coversheet template.

5. An information processing apparatus as claimed in claim 4, wherein said fixed character string expanding unit is responsive to selection of the desired coversheet template by said selecting unit, for expanding the at least one fixed character string set in the selected coversheet template, and said information expanding unit is responsive to the selection, for expanding the information specified by the attributes set in the plural information field defined in the selected coversheet template.

6. An information processing apparatus as claimed in claim 1, further comprising a registration unit that registers at least one coversheet template in which the plural information field is defined, and a selecting unit that selects a desired coversheet template from the at least one registered coversheet template.

7. An information processing apparatus as claimed in claim 6, further comprising a determination unit, responsive to selection of the desired coversheet template by said selecting unit, that determines whether or not the at least one character string is set in the selected coversheet template, and wherein if no fixed character string is set in the selected coversheet template, said information expanding unit expands only the information specified by the attributes set in the plural information field defined in the selected coversheet template.

8. An information processing method for adding a coversheet to data, comprising the steps of:
   defining a plural information field in a text field provided on a coversheet template and in which information is to be written, the plural information field being for setting therein attributes specifying the information to be written in the text field, and a number of the information to be written;
   setting at least one fixed character string to be written in the text field of the coversheet template, in the coversheet template in association with the information specified by the attributes set in the plural information field;
   repeatedly expanding the at least one fixed character string on the text field of the coversheet template a number of times corresponding to the set number of the information;
   repeatedly expanding the information specified by the attributes set in the plural information field a number of times corresponding to the set number of the information; and
   adding the coversheet template having the at least one fixed character string and the information expanded on the text field, as a coversheet to data.

9. A computer-readable storage medium storing a computer executable program for adding a coversheet to data, the program comprising:
   a defining module for defining a plural information field in a text field provided on a coversheet template and in which information is to be written, the plural Information field being for setting therein attributes specifying the information to be written in the text field, and a number of the information to be written;
   a setting module for setting at least one fixed character string to be written in the text field of the coversheet template, in the coversheet template in association with the information specified by the attributes set in the plural information field;
   a fixed character string expanding module for repeatedly expanding the at least one fixed character string on the text field of the coversheet template a number of times corresponding to the set number of the information;
   an information expanding module for repeatedly expanding the information specified by the attributes set in the plural information field a number of times corresponding to the set number of the information; and
   an adding module for adding the coversheet template having the at least one fixed character string and the information expanded on the text field, as a coversheet to data.

10. An information processing apparatus having a function of transferring transmission data, to which is added a coversheet where address information is expanded, to a data communication apparatus, comprising:
    a producing unit that produces coversheet templates having a text field provided thereon and having no address information;
    a registration unit that registers the coversheet templates produced by said producing unit;
    a selecting unit that selects a desired coversheet template from the coversheet templates registered by said registration unit; and
    a generating unit, operable when the desired coversheet template is selected in generating the transmission data, that defines a field for a plurality of address information in the text field on the coversheet template, and that expands the plurality of address information according to a size of the text field to generate the coversheet.

11. An information processing apparatus as claimed in claim 10, wherein said generating unit comprises a first expanding unit that expands the plurality of address information by an amount corresponding to a size of the text field on the text field, a determination unit that determines whether or not any address information goes beyond the size of the text field, and a second expanding unit that generates at least one required number of coversheet for the address information going beyond the size of the text field and expanding the address information going beyond the size of the text field on the generated at least one coversheet if said determination unit determines any address information going beyond the size of the text field.

12. An information processing apparatus as claimed in claim 10, wherein the address information comprises information convertible into text data representing names, addresses, telephone numbers, facsimile numbers, electronic mail addresses, and others of senders and recipients.

13. An information processing apparatus as claimed in claim 10, wherein the text field comprises text data including a text region, and attribute fields including a plural address information field.

14. An information processing system comprising:
an information processing apparatus having a function of transferring transmission data to which is attached a coversheet where address information is expanded; and
a data communication apparatus that transmits the transmission data transferred from said information processing apparatus, in a predetermined format via a communication medium;
wherein said information processing apparatus comprises a producing unit that produces coversheet templates having a text field provided thereon and having no address information, a registration unit that registers the coversheet templates produced by said producing unit, a selecting unit that selects a desired coversheet template from the coversheet templates registered by said registration unit, and a generating unit operable when the desired coversheet template is selected in generating the transmission data, for defining a field for a plurality of address information in the text field on the coversheet template, and for expanding the plurality of address information according to a size of the text field to generate the coversheet.

15. An information processing system as claimed in claim 14, wherein:
said producing unit of said information processing apparatus comprises a first expanding unit that expands the plurality of address information by an amount corresponding to a size of the text field, a determination unit that determines whether or not any address information goes beyond the size of the text field, and a second expanding unit that generates at least one required number of coversheet for the address information going beyond the size of the text field and expanding the address information going beyond the size of the text field on the generated at least one coversheet if said determination unit determines any address information going beyond the size of the text field.

16. An information processing apparatus as claimed in claim 15, wherein the address information comprises information convertible into text data representing names, addresses, telephone numbers, facsimile numbers, electronic mail addresses, and others of senders and recipients.

17. An information processing system as claimed in claim 15, wherein the text field comprises text data including a text region, and attribute fields including a plural address information field.

18. A coversheet generating method executed by an information processing apparatus having a function of transferring transmission data, to which is added a coversheet where address information is expanded, to a data communication apparatus, comprising the steps of:
producing coversheet templates having a text field provided thereon and having no address information;
registering the coversheet templates produced in said producing step;
selecting a desired coversheet template from the coversheet templates registered in said registration step; and
generating the coversheet when the desired coversheet template is selected in generating the transmission data, by defining a field for a plurality of address information in the text field on the coversheet template, and expanding the plurality of address information according to a size of the text field.

19. A computer-readable storage medium storing a computer executable program for generating a coversheet where address information is expanded, the program comprising:
a producing module for producing coversheet templates having a text field provided thereon and having no address information;
a registration module for registering the coversheet templates produced by said producing module;
a selecting module for selecting a desired coversheet template from the coversheet templates registered by said registration module; and
a generating module operable when the desired coversheet template is selected in generating the transmission data, for defining a field for a plurality of address information in the text field on the coversheet template, and for expanding the plurality of address information according to a size of the text field to generate the coversheet.

20. An information processing apparatus for generating a coversheet, comprising:
a template producing unit that produces a template in which an address information field for address information and a fixed information field for fixed information associated with the address information are defined;
a setting unit that sets a plurality of address information in the address information field of the template; and
a coversheet generating unit that generates a cover sheet by expanding the plurality of address information set in the address information field of the template, on the address information field of the template,
wherein said cover sheet generating unit repeatedly expands the fixed information on the fixed information field of the template a number of times corresponding to the number of the address information.

21. An information processing apparatus as claimed in claim 20, wherein said coversheet generating unit adds the coversheet to data to be transmitted to a data communication apparatus.

22. An information processing apparatus as claimed In claim 20, wherein said storage unit stores the plurality of templates produced by said template producing unit, said coversheet generating unit generate the coversheet using one of the plurality of templates.

23. An information processing method for adding a coversheet to data, comprising the steps of:
producing a template in which an address information field for address information and a fixed information field for fixed information associated with the address information are defined:
setting a plurality of address information in the address information field of the template;
expanding the plurality of address information set in the address information field of the template, on the address information field of the template; and
repeatedly expanding the fixed information on the fixed information field of the template a number of times corresponding to the number of the address information.

* * * * *